INVENTORS,
JAMES D. PATRICK
ARNOLDS JANSONS
ATTYS.

Sept. 3, 1957 J. D. PATRICK ET AL 2,805,390
A. C. PERMEABILITY AND HYSTERESIS ANALYZER
Filed July 21, 1954 2 Sheets-Sheet 2
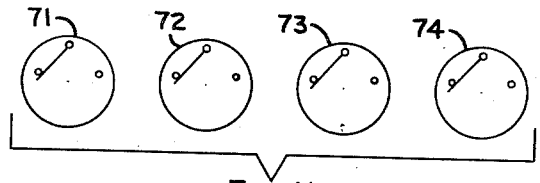
FIG. 1b
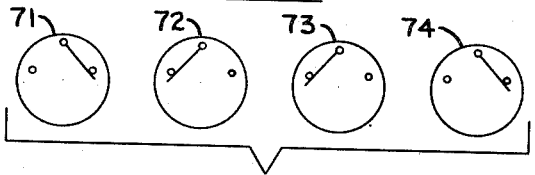
FIG. 1c
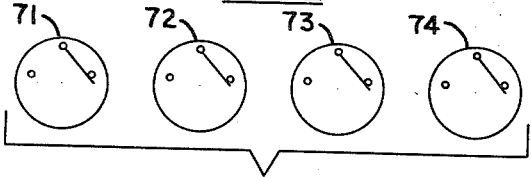
FIG. 1d
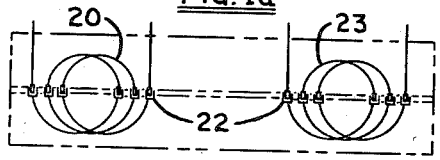
FIG. 3
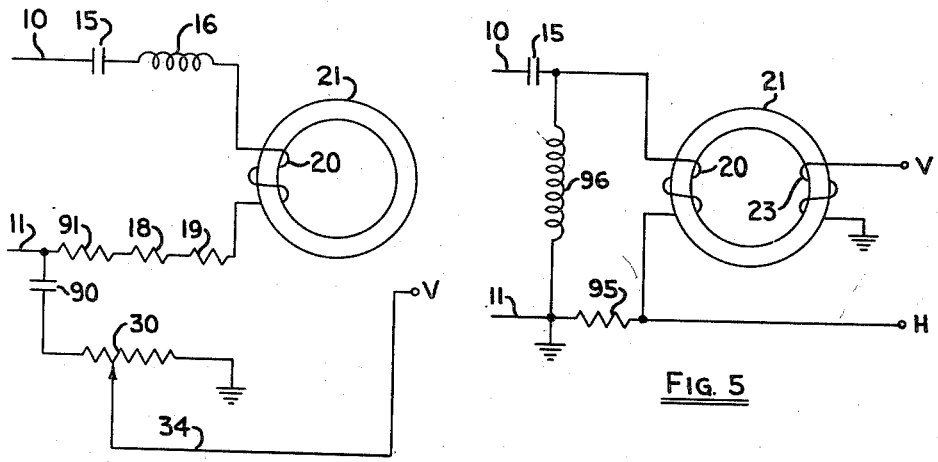
FIG. 4
FIG. 5
INVENTOR.
JAMES D. PATRICK
ARNOLDS JANSONS
BY
G. D. O'Brien
F. L. Steyner
ATTYS.

United States Patent Office 2,805,390
Patented Sept. 3, 1957

2,805,390

A. C. PERMEABILITY AND HYSTERESIS ANALYZER

James D. Patrick and Arnolds Jansons, Indianapolis, Ind.

Application July 21, 1954, Serial No. 444,926

13 Claims. (Cl. 324—40)

(Granted under Title 35, U. S. Code (1952), sec. 266)

The invention described herein may be manufactured and used by or for the Government of the United States of America for governmental purposes without the payment of any royalties thereon or therefor.

This invention relates to alternating current permeability and hysteresis analyzers and more particularly to analyzer means to visually compare and measure the dynamic magnetic permeability and hysteresis properties of core members providing good accuracy and ease of operation suitable for research as well as production line applications.

In some prior known means of analyzing core members the cores to be analyzed are compared with a known standard core member and those within certain predetermined ranges of the known standard are acceptable for certain requirements. Another known means is to connect a vacuum tube voltmeter across the secondary of the analyzed core member to obtain the peak-to-peak voltage output for computing in terms of permeability. These known means are very inaccurate, are time consuming, and are subject to considerable human error and therefore considered as inadequate for the purpose of preparing core members for precision devices. The present invention substantially overcomes these disadvantages.

In the present invention a standard single beam oscilloscope is used with novel circuitry connected thereto including switches and circuit interrupters operable to produce a plurality of patterns on the oscilloscope screen indicating the various characteristics and properties of a core member under analysis. These indications are preferably made by utilizing sinusoidal exciting voltage or current in the circuitry. In one switched circuit arrangement for indicating permeability, the patterns of the core loop, the constant permeability loop, a zero magnetizing force reference marker and a magnetizing force marker are presented on the screen for measurement and comparison. In another switched arrangement for indicating hysteresis, the patterns of the hysteresis loop, a magnetizing force marker, a magnetic flux density marker, and a zero magnetizing force reference marker are presented on the oscilloscope screen. Where desirable, switching arrangements may be provided whereby permeability and hysteresis and their related patterns may be shown simultaneously on the oscilloscope screen. From these indications the differential permeability, magnetizing force, core losses, etc., at any point in the magnetic cycle can be determined. It is therefore a general object of this invention to provide a visual indication with circuitry capable of producing a plurality of simultaneous patterns on the indicator presenting the permeability and hysteresis characteristics and properties of a core member under observation in the circuitry whereby a number of cores may be analyzed in quick succession.

These and other objects, advantages, features, and uses will become more apparent as the description proceeds when considered with the accompanying drawings, in which:

Fig. 1 is an illustration of a general schematic circuit diagram of the analyzer device of this invention;

Figs. 1b, 1c, and 1d show the three other positions of the electrical chopper-switches incorporated in Fig. 1;

Fig. 3 illustrates the construction of removable primary and secondary windings for annular or closed core members;

Fig. 4 illustrates a modification of the circuit of Fig. 1 in the switch arrangement of producing the constant permeability loop; and Fig. 5 illustrates a modification of the circuit shown in Fig. 1 wherein sinusoidal voltage excitation is utilized in exciting the test cores.

Figures 1, 2:
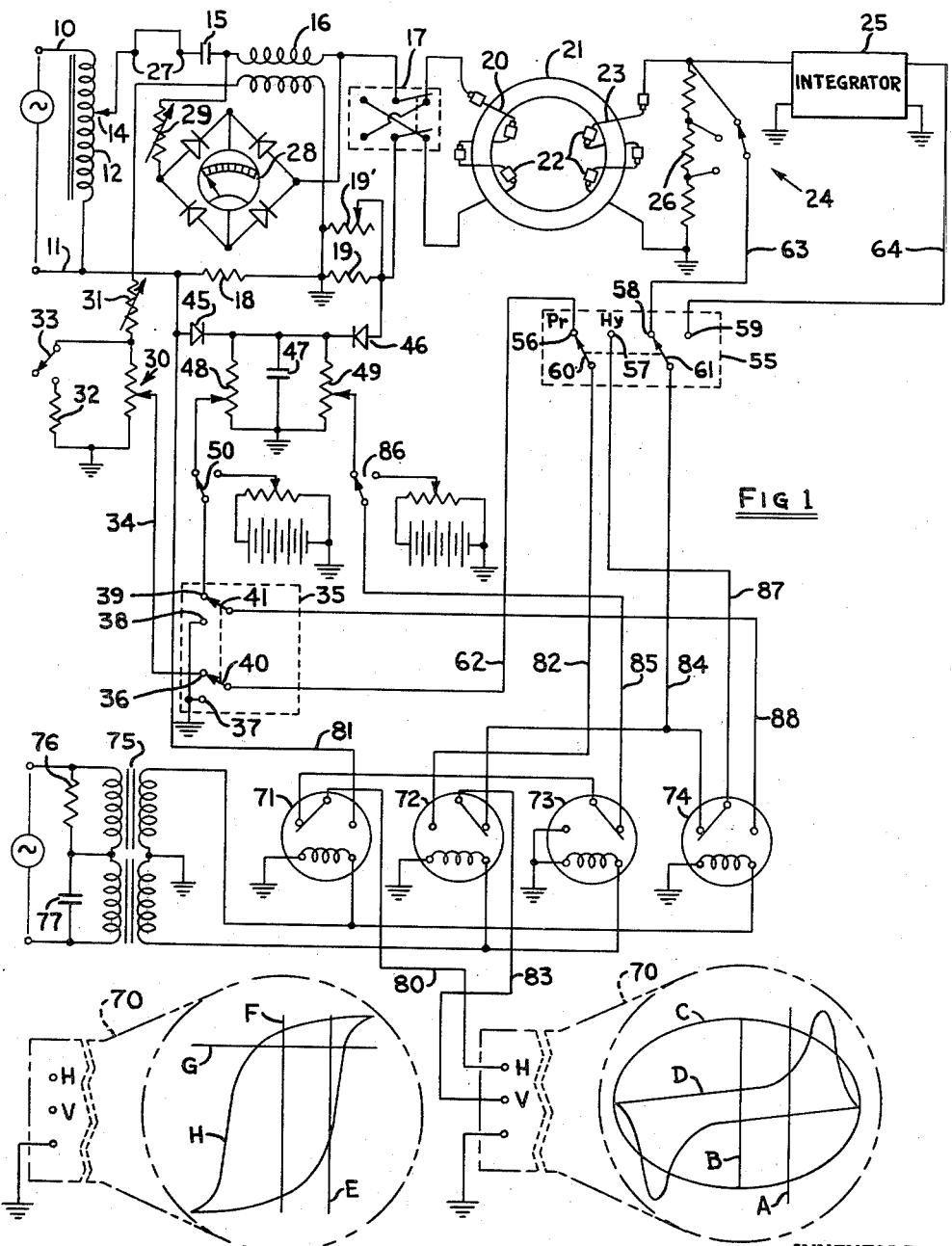
Fig. 2 illustrates the oscilloscope screen images for another switched arrangement of the circuit of Fig. 1.

Referring more particularly to Fig. 1, a sinusoidal exciting current enters the circuit over the conductors 10 and 11 and is impressed across the winding of a variable transformer or "Variac" 12. The movable tap 14 of the "Variac" is connected through a condenser 15 and an air core inductor 16 to the switch blade of a double-pole-double-throw reversing switch 17. The conductor 11 is connected through resistors 18 and 19 to the other switch blade of the switch 17. The output terminals of the switch 17 are connected through a core winding 20 which may, and preferably is, a single turn about a core member to be analyzed. The core member to be analyzed is shown at 21 and may be removed and replaced with other core members to be analyzed. The core member 21 can be disconnected by the electrical connectors 22 on the core winding. A removable output core winding 23, coupled by connectors 22, is connected at one end to ground and the other end to a terminal of a switch 24 and to an integrator circuit 25 of any well known design, as an RC circuit or the like. The output of core winding 23 preferably has resistors 26 connected across its terminals with leads therefrom to switch terminals on the switch 24 whereby various voltage levels may be selected. A variable resistor 19' may be connected in parallel to the resistor 19 for the purpose later to be described and made clear.

In order to determine the current flow for excitation an alternating current (A. C.) ammeter (not shown) may be connected to the terminals 27. It may be preferable, as shown, to meter the current with a direct current (D. C.) meter 28 coupled in a rectifying circuit connected across the inductor 16 through a variable resistor 29. Where the D. C. meter is used, the terminals 27 can be jumped with a conductor, as shown.

Control circuits are coupled into the excitation supply current for the control of the analyzer, as will later be described. The inductor 16 has a secondary connected to one end of a potentiometer 30 through a variable resistor 31. The potentiometer 30 has a fixed resistor 32 in parallel therewith which may be switched in or out by the switch 33. The movable tap of the potentiometer 30 is connected through conductor 34 to a switch terminal 36 of a double-pole-double-throw switch 35. Poles 37 and 38 of switch 35 are connected to ground. The coupling between the resistors 18 and 19 is connected to ground and the outer terminal of each resistor is each connected through a rectifier 45 and 46, respectively, to a common point which common point is connected through a condenser 47 to ground. Connected across the output of each rectifier 45 and 46 to ground is a potentiometer 48 and 49, respectively. The movable tap of the potentiometer 48 is connected to the switch pole 39 of the switch 35 through a single-pole-double-throw switch 50. The switch 50 may be switched to connect the switch pole 39 to an independent D. C. source, the reason for which will later become clear. The coupling of the movable tap on the potentiometer 49 will soon be described.

Another double-pole-double-throw switch 55 is used having switch poles 56, 57, 58, and 59, the poles 56 and 57 being in switch relation with the switch blade 60 and the poles 58 and 59 being in switch relation with the switch blade 61. The switch blade 40 of switch 35 is coupled through conductor 62 to the terminal 56 of switch 55. The terminal 58 of switch 55 is coupled through the conductor 63 to the switch blade of the switch 24 and terminal 59 is connected through conductor 64 to the output of the integrating circuit 25.

The analysis of the core member 21 is visually given on the fluorescent screen of an oscilloscope shown in phantom lines at 70. Several traces or patterns are needed for analysis and comparison and this is accomplished through the use of four electrical chopper-switches 71, 72, 73, and 74. The chopper-switches are operated from an alternating current source through the transformer 75. This source must have a lower frequency than that of the exciting source and preferably several times lower. For example, if a 400 cycle exciting frequency is used, a 60 cycle source for operating the chopper-switches is very satisfactory. A resistor and a condenser 76 and 77 are respectively coupled from a lead to the center position of the transformer primary to place the two halves of the primary out of phase ninety electrical degrees. Chopper-switches 71 and 74 are coupled to the upper secondary and the chopper-switches 72 and 73 are connected to the lower secondary so that chopper-switches 71 and 74 operate out of phase with chopper-switches 72 and 73. The left contact of chopper-switch 71 is connected to the switch blade of chopper-switch 73. The switch blade of chopper-switch 71 is connected by conductor 80 to the horizontal input of the oscilloscope 70. The right contact of chopper-switch 71 is connected by conductor 81 to the conductor 11 of the excitation supply. In chopper-switch 72, the left contact is coupled by conductor 82 to the switch blade 60 of switch 55, the switch blade is coupled by conductor 83 to the vertical input of the oscilloscope, and the right contact is coupled to the left contact of chopper-switch 74 and to the switch blade 61 of switch 55 by conductor 84. In chopper-switch 73, the left contact is grounded and the right contact is connected through conductor 85 to the movable tap of potentiometer 49. A double-pole-single-throw switch 86 is in the conductor 85 so that the right contact of chopper-switch 73 may be connected to an independent D. C. source, as will later be made clear. In chopper-switch 74, the switch blade is coupled through conductor 87 to contact 57 of switch 55 and the right contact is connected by conductor 88 to the switch blade 41 of the switch 35.

Since the chopper-switches work in pairs of two and the two pairs are out of phase, there will be four contact position combinations through which they will pass each cycle. The first position, hereinafter referred to as position (a), is shown in Fig. 1. The other three positions (b), (c), and (d) are shown in Figs. 1b, 1c, and 1d, respectively. The switch 55 resting as shown in the (Pr) position will analyze the permeability of the core 21; while the switch 55 positioned at (Hy) will analyze the hysteresis of the core 21. Switch 24 can be positioned on any desirable tap to produce the desirable potential on the vertical input of the oscilloscope to expand or contract the vertical deflection by known amounts. Switch 35 may be used to place the vertical input of the oscilloscope 70 at ground potential at any time. Switch 33 may be used to change the permeability range of the potentiometer 30 by a known amount. The switch 17 is used to place both halves of the core loop pattern, soon to be described, within the range of the magnetizing force marker, if desired. The variable resistor 31 is a voltage dropping resistor to adjust the potentiometer 30 to the proper range of permeability for the core 21 being tested.

The variable resistor 19' is used to calibrate out minor errors in the magnetizing force marker.

In the operation of the device, with the throw switches resting as shown in Fig. 1, four patterns will appear simultaneously on the screen of the oscilloscope 70. These four patterns are produced in corresponding chopper-switch positions in the following manner:

(a) Magnetizing force marker, reference A
(b) Zero magnetizing force marker, reference B
(c) Constant permeability loop, reference C
(d) Core permeability loop, reference D Each pattern can be traced through the circuit shown in Fig. 1. In the (a) position of the chopper-switches the horizontal oscilloscope input is connected to D. C. from the potentiometer 49 via chopper-switches 71 and 73. The vertical input to the oscilloscope is connected to the output of the loop 23 on the test core 21 through chopper-switch 72, switch 55, and switch 24. These oscilloscope inputs produce the vertical magnetizing force marker (A) on the screen as shown in Fig. 1. In the (b) position, shown for chopper-switch positions in Fig. 1b, the horizontal input to the oscilloscope is now grounded through the left contact of chopper-switch 73 and the vertical input is coupled to the adjustable tap of the potentiometer 30 through conductors 83, 82, 62, and 34 which produces the zero magnetizing force marker (B) on the screen. The voltage at quadrature to the current in winding 20 is developed at the adjustable tap of potentiometer 30 by which the length of the marker (B) can be controlled. In the (c) position of the chopper-switches the horizontal input is connected to the excitation conductor 11 through conductor 81 and the vertical input is coupled, as before in position (b), to the potentiometer 30 which produces the constant permeability loop pattern (C) on the screen. In the position (d) of the chopper-switch the horizontal input is coupled, as in the (c) position, to the excitation conductor 11 and the vertical input is connected to the output of the core winding 23, as in position (a), to produce the permeability loop (D) on the screen. In either the (b) or (c) chopper-switch positions the vertical input could be brought to zero potential by the switch 35. Also the reversing switch 17 may be switched, if desired, to place the other half of the core loop pattern within the range of the marker (A) on the screen; that is, the permeability loop would be revised symmetrically about marker B. Controls on the oscilloscope can be used to show only one half of the pattern, as is well known. All four patterns appear simultaneously on the screen since the chopper-switches work very rapidly. The oscilloscope screen may also be calibrated with indicia and lines from which actual measurements may be made of the permeability characteristics of the core 21.

By throwing the switch 55 to the (Hy) position the hysteresis characteristics and properties may be determined of the test core 21. The chopper-switches operate through the same cycles going through the switch positions (a), (b), (c), and (d) as before but the conductor 82 is now connected to conductor 87 and the conductor 84 is now connected to conductor 64 to the integrator. A hysteresis pattern will now be presented on the screen along the markers as shown in Fig. 2. The chopper-switch positions will present the patterns on the screen in the corresponding following manner:

(a) Magnetizing force markers, reference (E)
(b) Zero magnetizing force marker, reference (F)
(c) Flux density marker, reference (G)
(d) Hysteresis loop, reference (H)

The circuits may be traced to produce the four patterns on the screen in the same manner as they were traced above for permeability. As may be readily realized, the various markers can be shifted, as desired, to analyze various portions of the permeability or hysteresis loops representative of various portions of the excitation cycle, the horizontal D. C. input being controlled by the potentiometer 49 and the vertical D. C. input, in the hysteresis test position (Hy), being under the control of the potentiometer 48.

In the above operation it is shown that either the permeability or the hysteresis properties may be visually compared and measured as desired merely by selecting the switch position (Pr) or (Hy) on the switch 55. It may also be readily apparent that by making the switch 55 another pair of chopper-switches operating at a third frequency both permeability and hysteresis patterns and their markers could be simultaneously placed on the oscilloscope screen. If this were done, various markers could be switched out by individual switches, if desired. By the above analysis of core members the cores can be typed, compared, or matched for use in precision instruments, or the like, without using a standard core.

As hereinbefore stated the core windings 20 and 23 are removable from core members so that different core members may be analyzed. As shown and described for Fig. 1, the connectors 22 may be utilized to make complete coils about a closed core member. As better shown in Fig. 3 a more practical illustration of producing removable windings is to provide each half turn with a connector 22 so that when the halves are brought together around a core portion the winding circuit is completed. The winding half-turns may be fixed in a connector support together with the connectors 22 so that the two halves can be readily placed on, or removed from, a core member. It also may be desirable to fix both the primary and secondary in the same support.

Referring now to Fig. 4, the circuit of Fig. 1 may be modified to produce the constant permeability loop (C) for the switch 55 position (Pr) and the chopper-switch position (c), the circuit parts as the rectifying network, etc. not being illustrated herein to simply the description. The conductor 34 is connected to the adjustable tap of the potentiometer 30 as in Fig. 1 but the potentiometer herein is connected through a condenser 90 to the excitation conductor 11. A fixed resistor 91 is coupled between this point of connection and the resistor 18. The potentiometer 30 may be calibrated in terms of differential permeability in adjusting the vertical input to the oscilloscope.

The permeability and hysteresis analysis may be accomplished by utilizing sinusoidal voltage excitation as mentioned heretofore. This may be accomplished by modifying the circuit of Fig. 1 as shown basically in Fig. 5 wherein excitation conductor 10 is connected through the condenser 15 directly to the exciting winding 20 on the core 21. The conductor 11 is connected through a fixed resistor 95 to the other lead of the winding 21. An inductance coil 96 is placed across the leads 10 and 11 from the output side of the condenser to the input side of the resistor 95. In this modification the number of exciting turns for the winding 20 should be relatively large and the value of the horizontal drive resistor 95 should be as low as feasible to insure sinusoidal voltage excitation.

If other than sinusoidal exciting sources are used, the tuned condenser-inductance circuit would have to be constructed for the exciting input, as is well understood in the art.

While many modification and changes may be made in the constructional details and couplings without department from the spirit and scope of this invention, we desire to be limited only by the scope of the appended claims.

We claim:

1. A permeability and hysteresis core analyzer comprising; a core member to be analyzed; means for exciting said core member to be analyzed; secondary means on said core member; integrator means coupled to said secondary means; an oscilloscope; direct current sources; and switch means having switch inputs coupled to said exciting means, said secondary means, said integrator means, and said direct current sources and having switch outputs coupled to the horizontal and vertical circuits of said oscilloscope for switching said secondary means, said integrator, said exciting means, and said direct current sources to the horizontal and vertical inputs of said oscilloscope in rapid predetermined combined sequence to present patterns of permeability and hysteresis and patterns of reference markers whereby the magnetic permeability and hysteresis properties of core members may be analyzed.

2. A permeability and hysteresis core analyzer comprising; an oscilloscope; a core to be analyzed; electrical supply means for exciting said core; removable secondary winding means on said core; adjustable direct current means; integrating means connected to said secondary; switching means in said connection for switching the output of said secondary through and by-passing said integrator; and rapid switching means coupled to said electrical supply, said adjustable direct current means, said switching means, and the vertical and horizontal circuits of said oscilloscope for switching said electrical supply, said secondary winding through said first mentioned switch, and said direct current means to the vertical and horizontal inputs of said oscilloscope in four switched conditions in which the horizontal circuit is coupled to said direct current means in the first and second switched conditions and to the electrical supplly means in the third and fourth switched conditions and in which said vertical circuit is coupled to said secondary winding through said first mentioned switch in the first and fourth switched conditions and to said electrical supply means, said direct current means, and said secondary means in sequence in the second and third switched conditions whereby the permeability loop of the core, a constant pemeability loop, and markers positioned by said adjustable direct current means is presented on the screen of said oscilloscope in one position of said first mentioned switching means and a hysteresis loop and reference markers positioned by said adjustable direct current means are presented on said screen in the other position of said first mentioned switching means.

3. A permeability and hysteresis core analyzer as set forth in claim 2 wherein said permeability loop is presented when said first-mentioned switching means is switched to by-pass said integrator and said hysteresis loop is presented when said first mentioned switching means connects said secondary winding through said integrator.

4. A permeability and hysteresis core analyzer as set forth in claim 3 wherein said rapid switching means are double contact electrical choppers.

5. A permeability and hysteresis core analyzer as set forth in claim 2 wherein said supply means for exciting said core is sinusoidal current.

6. A permeability and hysteresis core analyzer as set forth in claim 2 wherein said supply means for exciting said core is an alternating voltage of sinusoidal wave form.

7. A permeability and hysteresis core analyzer comprising; a core to be analyzed; a controlled electrical supply for exciting said core; a removable secondary winding on said core for having current induced therein from said core; an integrator connected to said secondary winding; an oscilloscope; switching means including means to couple the vertical input of said oscilloscope and said secondary winding arranged to switch said integrator in and out of said coupling and including means to attenuate the induced current in said secondary winding; a variable control coupling said electrical supply and the vertical input of said oscilloscope; means coupling said electrical supply to the horizontal input of said oscilloscope; adjustable direct current means coupled to each said horizontal and vertical inputs of said oscilloscope; and means for rapidly chopping and switching said inputs to said vertical and horizontal inputs whereby permeability and hysteresis loop patterns may be selectively placed on the screen of said oscilloscope in accordance with the position of said switching means and said patterns can be analyzed by reference to a constant permeability loop produced when said vertical and horizontal inputs are connected to said electrical supply, and by reference to horizontal and vertical markers produced when said vertical and horizontal inputs are coupled to said direct current means.

8. A permeability and hysteresis core analyzer as set forth in claim 7 wherein said means for chopping and switching said oscilloscope inputs chop and switch said circuits to produce four consecutive patterns in rapid sequence for each position of switching means including said first-mentioned means, one position in which said integrator is by-passed producing a core permeability loop, a constant permeability loop, a zero magnetizing force marker, and a positionable magnetizing force marker, and the other position of said switching means connecting said integrator producing a hysteresis loop, a flux density marker, a zero flux density marker, and a magnetizing force morker, on said oscilloscope screen.

9. A permeability and hysteresis core analyzer as set forth in claim 8 wherein said constant permeability loop can be varied by said variable control coupling said electrical supply to said oscilloscope vertical input, and said adjustable direct current means are potentiometers coupled from a rectifier network coupled to said electrical supply the adjustment of which places and controls the length and position of the markers on said oscilloscope screen.

10. A permeability and hysteresis core analyzer as set forth in claim 9 wherein said controlled electrical supply is controlled by a variable transformer and said switching means including means to attenuate the induced current in said secondary winding is an adjustably tapped resistance across said secondary winding.

11. A permeability and hysteresis core analyzer as set forth in claim 10 wherein said removable secondary winding has disengageable electrical connections at diametrical opposite points thereof whereby the winding may be looped about annular cores.

12. A permeability and hysteresis core analyzer as set forth in claim 7 wherein said electrical supply for exciting said core is alternating current having sinusoidal wave form.

13. A permeability and hysteresis core analyzer as set forth in claim 7 wherein said electrical supply for exciting said core is an alternating voltage of sinusoidal wave form.

References Cited in the file of this patent
UNITED STATES PATENTS

| 1,695,679 | Berlowitz | Dec. 18, 1928 |
| 2,283,742 | Leonard | May 19, 1942 |
| 2,389,190 | Fermier | Nov. 20, 1945 |
| 2,481,247 | Schott | Sept. 6, 1949 |
| 2,610,230 | Wiegand | Sept. 9, 1952 |